AUTOMATIC TELEPHONE SYSTEMS

Original Filed Aug. 27, 1948

United States Patent Office 2,731,513
Patented Jan. 17, 1956

2,731,513

AUTOMATIC TELEPHONE SYSTEMS

Theodorus Reumerman, Zandvoort, and Willem H. T. Helmig, Leiden, Netherlands

Original application August 27, 1948, Serial No. 46,494, now Patent No. 2,646,923, dated July 28, 1953. Divided and this application April 19, 1951, Serial No. 221,761

9 Claims. (Cl. 179—18)

This application is a division of our copending application Ser. No. 46,494, filed on August 27, 1948, now Pat. No. 2,646,923.

The invention relates to automatic telephone systems and to other systems adapted to be controlled by inserting a sequence of digits, and has for its object to provide means whereby the operation of the system is prevented in the case of an error in the sequence of digits inserted. The invention also relates to means for determining a check symbol for a symbol group.

In an automatic telephone system, pulsing means is operated by the calling subscriber to transmit a sequence of electrical impulses representing the number of a called subscriber. As the pulsing means is commonly dial-operated, reference is herein made to the sequences "dialled," the term "dialled" being used for convenience and clarity to indicate the generation or transmission of impulses without limitation to the particular pulsing means used. With present systems, there is an ever-present danger of a subscriber operating the pulsing means incorrectly and thereby calling a wrong number.

In the telephone system according to the invention, the figures from 1 to 0, out of which the telephone numbers are composed, are assumed to be numbered in a predetermined order, i. e. different characteristic numbers are ascribed to each of these figures in any desired order. In general, it will be preferable for practical purposes to number the figures according to the number of impulses transmitted by the dial of a telephone apparatus upon selection of a figure, so that characteristic numbers from 1 to 9 are ascribed to the figures from 1 to 9, respectively, whereas the characteristic number 10 is ascribed to the figure 0.

According to the invention, each telephone number comprises, in addition to the figures serving to establish the desired connection, a check symbol to be dialled together with the said figures and giving an unequivocal indication of the remainder obtained on division by 11 of the sum of the characteristic numbers of the said figures, each multiplied by a factor dependent on the position of the figure in the telephone number and different for adjacent positions, and each connecting circuit in the telephone exchange comprises means actuated by the selection of the check symbol and serving to prevent the establishment of a connection if the desired check symbol does not correspond with the remaining figures of the selected telephone number.

The said check symbol may be determined by means of the following procedure. In the sequence of figures serving to establish a connection with a given line, the characteristic number of each figure is multiplied by a factor dependent on the position of the figure in the said sequence, i. e. the characteristic number of the first figure from the right is multiplied by a factor $k_1$, the characteristic number of the second figure from the right by a factor $k_2$, and so on. The factors prevailing for adjacent positions must be different. The products obtained in these multiplications are added together so as to produce a number which will be indicated as the check number hereinafter. The check number is divided by 11, and the remainder obtained in this division is indicated by an appropriate symbol, in such manner that all values to be assumed by the remainder are indicated by different symbols. Since the remainder may have eleven different values, eleven different check symbols will have to be used. The check symbols must be adapted to be selected by means of the dial of a telephone apparatus, so that they must be chosen from the figures from 1 to 0. As an eleventh check symbol, an open space (omission of the check symbol) may be used. In general, it will be preferable to indicate a remainder 1 by the figure 1, a remainder 2 by the figure 2, and so on. Thus, a remainder 10 will be indicated by the figure 0, and an open space will serve to indicate a remainder 0.

In a preferred embodiment of the invention, the check symbol of each telephone number gives a univocal indication of the remainder obtained on division by 11 of the sum of the characteristic numbers of the figures appearing in odd positions of the sequence of figures serving to establish the desired connection, decreased by the sum of the characteristic numbers of the figures appearing in even positions of said sequence, the said odd and even positions being determined by counting from right to left.

Thus, in the said preferred embodiment, the multiplication factor $k$ is equal to 1 for all odd positions of the sequence, and to $-1$ for all even positions. Hence, if the characteristic numbers of the figures from 1 to 0 are each equal to the number of impulses emitted upon selection of the figure in question, as explained hereinbefore, the check number may be found by subtracting the sum of the figures appearing in even positions of the sequence from the sum of the figures appearing in odd positions, the figure 0 counting as 10. Furthermore, if the remainders indicated by the check symbols are each equal to the number of impulses emitted upon selection of the check symbol in question, as explained hereinbefore, the check symbol will be equal to the remainder obtained on dividing the check number by 11, the remainder 10 being indicated by the figure 0, and the remainder 0 by an open space.

Suppose, for instance, that a certain line in an existing telephone system has the number 29047, so that 29047 is the sequence of figures serving to establish a connection with the said line. The check number prevailing for this line will be $(7+10+2)-(4+9)=6$, and the line will have the check symbol 6. Another line, having the number 25047, will have the check number $$(7+10+2)-(4+5)=10$$

and the check symbol 0. A third line, having the number 28347, will have the check number $$(7+3+2)-(4+8)=0$$

so that an open space will serve as a check symbol for this line.

Upon introducing the system according to the invention, the check symbol is incorporated in the telephone number, so that the existing telephone numbers 29047 and 25047 are changed to 290476 and 250470, respectively. The first five figures of the new telephone numbers serve for finding the desired line, and the last figure for checking whether the number has been correctly selected. The telephone number 28347, which has the open space for a check symbol, will be left unaltered. Thus, the check symbol of the telephone number will be selected by a calling subscriber together with the figures serving to establish the desired connection. In the telephone exchange, means actuated by the selection of the check symbol are provided for checking a selected number. A connection with the selected line is only established when the selected check symbol corresponds with the remaining figures of the number. In case of a disagreement, the calling subscriber has evidently selected a wrong number, and a connection with the selected line is prevented. The subscriber may now be supplied with a warning signal, for instance the usual "engaged" signal, or a special "wrong number" signal. In addition, means may be provided for disconnecting the calling subscriber after supplying him with the warning signal.

The invention will now be more fully explained with reference to the accompanying drawings, in which Fig. 1 is a circuit diagram of a telephone exchange comprising means for automatically checking a selected number;

Figures 1, 2, 3:
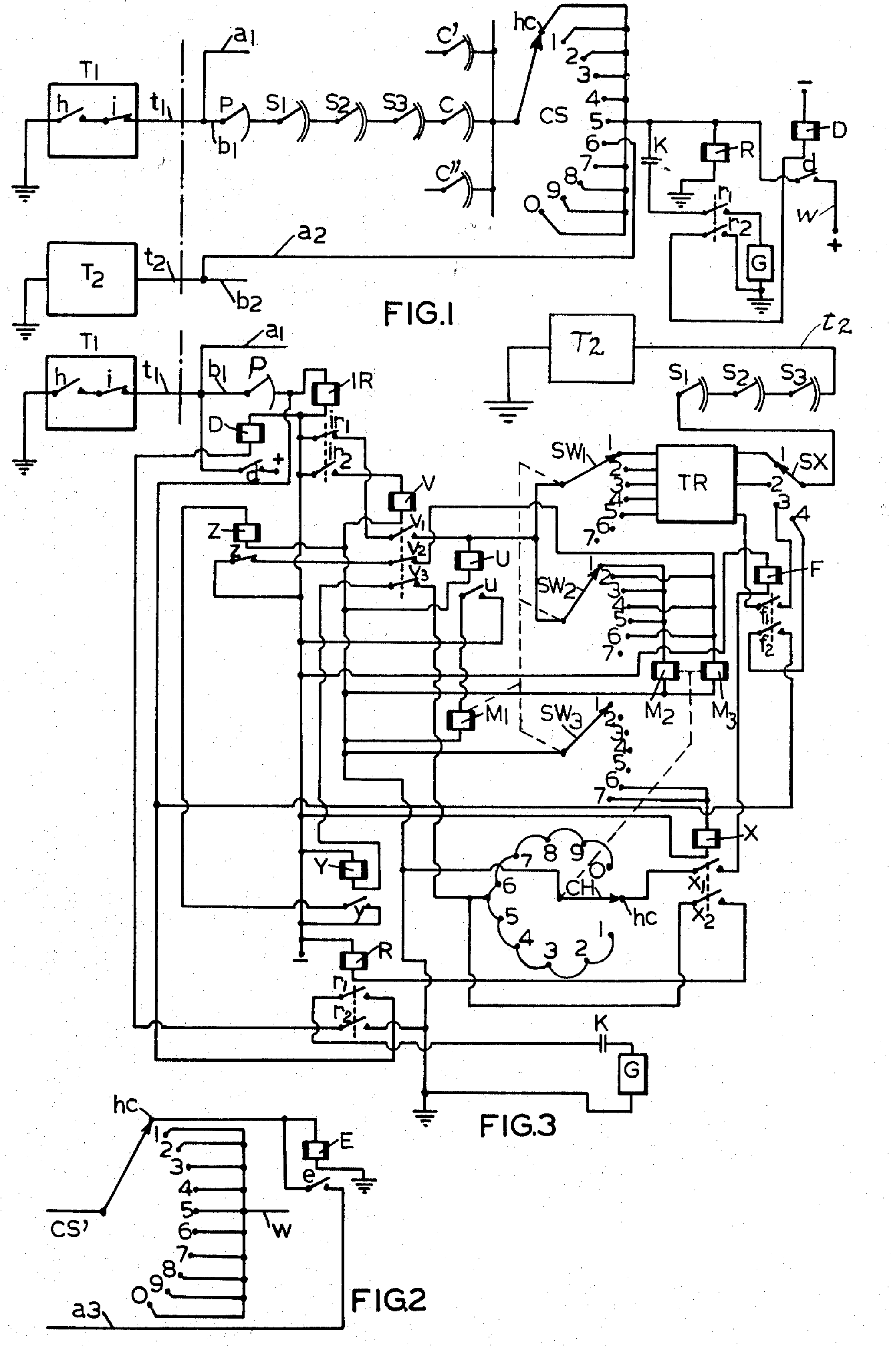
Fig. 2 shows a detail of the circuit represented in Fig. 1.
Fig. 3 is a circuit diagram of another embodiment of a telephone exchange comprising automatic checking means.

Various means may be used in the exchange for checking the selected numbers. For instance, in direct-access systems, such as the well-known Strowger system, an additional ten-point selector switch may be provided for each subscriber, this switch being inserted between the connectors giving access to the subscriber's line and the line itself. Instead of providing the usual multiple connections between the subscriber's line and the appertaining contacts of each connector, the line is connected with those contacts of the ten-point switch which correspond with the subscriber's check symbol, and the switch arms of the ten-point switch are connected with the connector contacts. The ten-point switch is provided with home contacts to which the subscriber's line is connected if his check symbol is the open space. The contacts of the ten-point switch which do not lead to the subscriber's line are connected with a signal generator supplying a warning signal upon selection of a wrong number. This may either be the usual "engaged" signal, or a special signal indicating the selection of a wrong number. The ten-point switch is controlled by the impulses transmitted to the exchange upon dialling the check symbol.

Thus, it will be understood that if a calling subscriber dials the telephone number proper, he is generally not immediately connected with the called line in the usual manner, but instead thereof, he is connected with the ten-point switch. By dialling the right check symbol, he may reach the desired line. If he dials the wrong check symbol, he gets the warning signal.

If the calling subscriber dials a number having the open space for a check symbol, the called line is immediately reached via the home contacts of the ten-point switch. If such a number is followed by a check symbol, the connection is again interrupted. In the meantime, the wrong number may have been called, however. Hence, the subscribers having the open space for a check symbol are at a slight disadvantage since their protection against wrong connections is not as efficient as for the other subscribers. This disadvantage may be substantially removed by connecting the line of such a subscriber with the appertaining ten-point switch through a make contact of a slowly operating relay, which is excited when a connection is established between a connector and the ten-point switch. Thus, the subscriber will only be called if the connection is maintained for some time, and the delay will generally be sufficient for interrupting the connection in case of a wrong number.

Means may be provided for disconnecting a subscriber who has made a wrong connection after a few seconds, so that the selector switches are not engaged any longer than necessary.

A circuit diagram of a telephone exchange operating in the above-described manner is shown in Figs. 1 and 2. For the sake of simplicity, all connections are indicated as single conductors.

Referring to Fig. 1, $T_1$ is the telephone apparatus of a subscriber, comprising the usual impulse contact $i$ and hook contact $h$, and connected with the exchange by means of a line $t_1$. In the exchange, the line $t_1$ is connected with line $a_1$ leading to the appertaining contacts of a plurality of connectors giving access to the line $t_1$, and with a line $b_1$ leading to a preselector P individual to the line $t_1$. The preselector may be a 25-point selector switch of the usual kind, each contact being connected with a different one of a group of first selectors $S_1$. The first selectors $S_1$ are followed in the usual manner by second selectors $S_2$, third selectors $S_3$, and final selectors or connectors C. Corresponding contacts of a group of connectors C, C′, C″, etc. giving access to a certain line $t_2$ are connected with the switch arms of a checking switch CS individual to the line $t_2$. The checking switch CS is provided with a home contact $hc$ and ten other contacts, numbered from 1 to 0. The contact 6, which is assumed to correspond with the check symbol of the line $t_2$, is connected with this line by the circuit $a_2$. The remaining contacts of the switch CS are connected with a circuit $w$, leading to a slowly energizing relay R, and connected through a condenser K and a make contact $r_1$ of the relay R to a signal generator G. A disconnecting relay D, operating with a suitable time lag, is connected in series with a second make contact $r_2$ of the relay R, and is provided with a make contact $d$ adapted to supply a suitable voltage to the circuit $w$ for disconnecting a subscriber who has made a wrong connection. Means operated by an appropriate voltage for disconnecting a subscriber are well known in the art, for instance for interrupting a local connection on receipt of a long distance call, so that a further description appears to be superfluous. $T_2$ is the telephone apparatus connected with the line $t_2$, and $b_2$ denotes the circuit leading to the preselector individual to the line $t_2$.

The operation of the above-described circuit is as follows. Suppose that the subscriber $T_1$ wants to establish a connection with subscriber $T_2$, who has the telephone number 290476, 6 being the check symbol. $T_1$ takes his receiver off the hook, thereby closing his hook contact $h$, and starting his preselector switch P, which connects the line $t_1$ with an idle first selector $S_1$. The subscriber dials the first figure 2, and the first selector makes two steps and finds an idle second selector $S_2$. The second and third selectors are operated in a similar manner by the transmission of the figures 9 and 0, whereupon the figures 4 and 7 are taken up by the connector C, so that a connection is established between the line $t_1$ and the 47th contact of connector C, this contact being connected with the checking switch CS of the desired line. The subscriber $T_1$ now dials the check symbol 6, and the connection is completed.

Now suppose that the subscriber $T_1$ wants to call number 390477 (7 being the check symbol), but dials 290477 by mistake. After dialling the fifth figure, he is connected with the checking switch CS individual to line $t_2$. Upon dialling the check symbol 7, a connection with the circuit $w$ is established, and relay R is excited. After a suitable time lag, the contacts $r_1$ and $r_2$ are closed, and the signal generator G supplies a warning signal to subscriber $T_1$. At the same time, relay D is excited, and after a second time lag, this relay closes its contact $d$, whereby subscriber $T_1$ is disconnected.

Fig. 2 shows the circuit of a subscriber who has the open space for a check symbol. In this case, the line $a_3$ leading from the subscriber's line to his checking switch CS′ is connected with the home contact $hc$, the contacts 1–0 being connected with circuit $w$. In order to prevent the subscriber from being troubled by wrong connections, the line $a_3$ is connected with the home contact $hc$ through a make contact $e$ of a slowly energizing relay E, likewise connected with the home contact $hc$. As soon as a connection between a connector and the checking switch CS′ is estblished, the relay E is excited. Now, if the calling subscriber still dials a check symbol, this will generally happen before the relay E has had time to close its contact $e$, so that the relay E will be disconnected before a wrong connection has been established. On the other hand, if no check symbol is dialled, the contact $e$ is closed and the desired connection is completed.

The ten-point switch CS may be of a simple and inexpensive construction. For instance, the usual ten-point preselector switches may be used for this purpose.

In automatic telephone systems making use of non-decimal selector switches, for instance of 30-point selectors, means are provided for storing the impulse trains transmitted by the dial of a calling subscriber, and for translating the same into other impulse trains suitable for controlling the selector switches. Such means are known as registers or translators.

The above-described checking circuit for direct-access systems may, of course, also be used in register systems. However, this would involve some complications, as the registers would have to store and to transmit an additional impulse train corresponding with the check symbol. Hence, it is preferred to use another kind of checking circuit in register systems.

In this preferred checking circuit for register or translator systems, a ten-point checking switch is connected in parallel with each of the translators so as to be controlled by the successive impulse trains transmitted by a calling subscriber. For each impulse train, the checking switch is operated by means of a different step magnet, displacing the switch for each impulse over a number of steps corresponding with the factor $k_i$ prevailing for the position in question of the telephone number. For instance, if a system is used wherein the factor $k_i$ is equal to 1 for all odd positions, and to $-1$ for all even positions, the checking switch is alternately rotated in opposite directions by means of two step magnets each displacing the switch over one step for each impulse. Thus, the checking switch is controlled in such manner by the impulses received from the subscriber that it determines the check symbol of the selected number. The check symbols indicate the remainder $R_N(G)$ in such order that the check number of a telephone number incorporating the check symbol is always equal to zero. In a system using only the factors 1 and $-1$, this condition is automatically satisfied if the figures indicate remainders corresponding with their numerical values. For instance, in this system the completed telephone number 290476 has the open space for a check symbol. Thus, a correctly selected telephone number will always return the checking switch to its zero position, whereas a wrong number will leave the checking switch in another position. By connecting the zero contact of the checking switch with a slowly operating relay, and inserting a make contact of this relay in the circuit transmitting the last impulse train from the translator to the final selector or connector switch, wrong connections may be prevented. The remaining contacts of the checking switch may be connected with a second relay, likewise operating with a certain time lag, which supplies the calling subscriber with a warning signal, and disconnects his apparatus after a few seconds, if desired, in the same way as has been described with reference to Figs. 1 and 2.

A circuit diagram of such a checking circuit is shown in Fig. 3. $T_1$ again indicates the telephone apparatus of a subscriber, provided with the usual hook contact $h$ and impulse contact $i$, and connected with the exchange through a line $t_1$, a branch line $b_1$ leading to a preselector switch P, individual to line $t_1$. The contacts of the preselector switch P are each connected with a different impulse relay IR, these impulse relays being individual to different translators. Relays U and V, actuated by the impulse relay IR, control a step magnet $M_1$ operating a director switch SW. The director switch SW serves primarily to direct the successive impulse trains emitted by a calling subscriber through contacts 1–5 of a switch arm $SW_1$ to different parts of the translator TR, so that these impulse trains may be stored and translated in the usual way. Additional switch arms $SW_2$ and $SW_3$ have been provided for checking purposes.

The translated impulse trains are successively directed by means of a second director switch SX to a first selector $S_1$, a second selector $S_2$, and a final selector or connector $S_3$, in order to establish the desired connection through line $t_2$ to a called station $T_2$.

Switch arm $SW_2$ has its contacts 1–6 alternately connected with a pair of step magnets $M_2$, $M_3$, adapted to actuate a checking switch CH in different directions. For instance, the step magnet $M_2$ may rotate the checking switch in a clockwise direction, and the step magnet $M_3$ may cause a rotation in counterclockwise direction. The switch arm $SW_2$ is connected in parallel with switch arm $SW_1$, so that the impulse trains supplied to the translator TR are also supplied to the step magnet $M_2$ or $M_3$.

Switch arm $SW_3$ is grounded, and has its contacts 6 and 7 connected with a relay X, serving to initiate the checking of the number selected by the calling subscriber.

The checking switch CH is provided with a zero contact $hc$, and with ten other contacts, numbered from 1 to 0. The home contact $hc$ is connected through a make contact $x_1$ of relay X with a relay F, having its make contact $f_1$ inserted in the circuit through which the translated impulses are directed to the final selector C. The remaining contacts 1–0 of the checking switch are connected through a make contact $x_2$ of relay X with a relay R, serving to supply the subscriber with a warning signal upon selection of a wrong number, and to disconnect the subscriber after a few seconds, if desired, in the same way as has been described with reference to Fig. 1.

The operation of the circuit is as follows. If the subscriber $T_1$ wants to call the number 290476, he takes his receiver off the hook, thereby closing his hook contact $h$ and starting his preselector P, which finds an idle translator. The impulse relay IR of this translator is energized, opens its break contact $ir_1$, and closes its make contact $ir_2$, thereby energizing relay V, which closes its contact $v_1$, and opens its contacts $v_2$ and $v_3$. The relay V remains energized as long as the receiver of subscriber $T_1$ is off the hook.

The subscriber now dials the first figure 2, and thereby causes two successive interruptions of his circuit, so that the relay IR is twice de-energized. The relay V is too slow to change over during an interruption and remains in the same position. Upon the first interruption, relay U is energized through contacts $ir_1$, and $v_1$ and closes its contact $u$, thereby energizing the step magnet $M_1$. The relay U is too slow to be de-energized between two impulses, so that it remains in the same position until the end of the first impulse train. Through the first contact of switch arm $SW_1$, the first impulse train is supplied to translator TR, to be stored and translated therein. At the same time, step magnet $M_2$ is twice energized through contact 1 of the switch arm $SW_2$, so that the checking switch CH is displaced over two steps in a clockwise direction.

At the end of the first impulse train, relay U is deenergized and opens its contact $u$, so that the step magnet $M_1$ is deenergized, and the director switch SW steps to its second position. Switch arm $SW_2$ is now connected with step magnet $M_3$. The second impulse train is supplied to the translator through contact 2 of switch arm $SW_1$, and actuates step magnet $M_3$ through contact 2 of switch arm $SW_2$. The checking switch CH makes nine steps in counterclockwise direction. At the end of the second impulse train step magnet $M_1$ is again de-energized, and the director switch steps to its third position.

Thus, the successive impulse trains are directed to appropriate parts of the translator TR, and at the same time actuate the checking switch CH in alternate directions.

In the meantime, translated impulse trains have been supplied to the first and second selectors through contacts 1 and 2 of director switch SX, and when the fifth figure has been dialled, the translator is ready to supply a last impulse train to the final selector C through contact 3 of switch SX as soon as a connection with the final selector will have been established. The director switch SW has now reached position 6, and the relay X has been energized through contact 6 of the switch arm $SW_3$, thereby preparing the checking circuit.

The subscriber now dials the last figure, and the director switch SW steps to position 7. Relay X remains energized through contact 7 of the switch arm $SW_3$. If the right number has been selected, the checking switch CH has been brought back to its home position, and the relay F is energized through home contact *hc* and make contact $x_1$. After a suitable time lag, the relay F closes its contact $f_1$, and the last impulse train is supplied to the final selector. After that, the director switch SX steps to position 4 and connects the subscriber with the desired line through contact $f_2$.

It is to be noted that upon selecting the number of a subscriber who has the open space for a check symbol, relay F is excited after selection of the fifth figure. However, the time lag of relay F has been chosen sufficiently great to protect such a subscriber against wrong connections, as described with reference to Figs. 1 and 2 hereinbefore.

Now suppose that the subscriber wanted to dial number 390477, but dialled 290477 by mistake. After selection of the last figure, the checking switch CH is left in position 1, and relay R is excited through contact $x_2$. After a suitable time lag, relay R closes its contacts $r_1$ and $r_2$ thereby supplying the subscriber with a warning signal, and exciting the disconnecting relay D at the same time. After a second time lag, relay D closes its contact *d*, and supplies a special voltage to the subscriber's line, causing him to be disconnected.

If the subscriber lays his receiver on the hook after having selected part of the figures of a telephone number, because he finds out that he has made a mistake, and if the checking switch CH does not occupy its zero position at that time, the latter is automatically returned to its zero position. The same applies if the subscriber lays his receiver on the hook after having received a warning signal, or if he is automatically disconnected. For this purpose, two relays Y and Z are provided, the relay Y being slow to energize and quick to de-energize, and the relay Z being quick to energize and slow to de-energize. The relay Y is connected through break contact $v_3$ of relay V with contacts 1–0 of the checking switch and has a make contact *y*, inserted in the excitation circuit of relay Z. Relay Z has a break contact *z* connected in series with the break contact $v_2$ of relay V, so that step magnet $M_3$ may be energized through contacts *z* and $v_2$.

As soon as the subscriber's line is interrupted, relay V is de-energized, and closes its contacts $v_2$ and $v_3$. Step magnet $M_3$ is energized through contacts *z* and $v_2$. Relay Y is energized via contact $v_3$ and closes its contact *y*, so that relay Z is energized and contact *z* is opened. Step magnet $M_3$ is now de-energized, so that the checking switch CH is displaced over one step in counterclockwise direction. As soon as the switch arm of the checking switch CH leaves the contact engaged thereby, the excitation circuit of relay Y is interrupted, so that this relay is immediately de-energized. However, relay Z cannot change over so quickly that the operation of step magnet $M_3$ might be interrupted, so that the movement of the checking switch CH continues until the same has reached its next position. Now, relay Z is de-energized, and step magnet $M_3$ is again energized. In the meantime, relay Y has again been energized through the newly engaged contact of the checking switch CH, so that relay Z is again energized after some time, and the whole cycle of operations is repeated. Hence, the checking switch CH is displaced step by step until it reaches the zero position, in which relay Y is no more energized.

Of course, similar means must be provided for returning director switches SW and SX and selectors $S_1$, $S_2$ and C to their zero positions, but these means are well known in the art, so that a description would be superfluous.

As appears from the above explanations, the use of the open space as a check symbol involves some complications in the automatic checking of telephone numbers. Of course, these complications could be avoided by passing over all numbers which would have the open space for a check symbol, but this procedure will generally be impracticable, since it decreases the capacity of the exchange by about 9%. However, in a new telephone network the said complications may be avoided by providing the dial of each telephone apparatus with eleven holes, so that the remainder 0 may be indicated by selection of the eleventh figure, thereby transmitting eleven impulses. The eleventh hole might be indicated, for instance, with the letter X, so that in a system wherein the factor $k_i$ is equal to 1 for all odd positions, and to $-1$ for all even positions, the telephone number 28347 would change to 28347X. In the circuit arrangement shown in Figs. 1 and 2, the checking switch CS would have to be provided with an eleventh contact in this case instead of the home contact *hc*, and the relay E would be superfluous. In the circuit arrangement shown in Fig. 3, the relay X might be connected with contact 7 of the switch arm $SW_3$, and the relay F could have a smaller time lag.

It is to be noted that the checking of telephone numbers, apart from preventing the subscribers from being troubled with wrong connections, has the important advantage that the selector switches are occupied for a shorter time by "wrong numbers," since no verbal communication is necessary for establishing the fact that a wrong number has been selected. Thus, fewer selectors will be required for a given traffic density. In this connection, the circuit shown in Fig. 3 has the special advantage that practically no final selectors are occupied for wrong numbers, so that a further decrease of the number of final selectors is made possible. Thus, the expenditure for checking apparatus will at least partially be compensated for by decreased expenses for selectors.

If desired, the above-described checking facilities may be restricted to a privileged group of subscribers, for instance by connecting only these subscribers with a special group of translators provided with checking switches as shown in Fig. 3. Of course, these subscribers would also have to be supplied with a special directory.

On the other hand, if the checking system shown in Figs. 1 and 2 is used, a privileged group of subscribers may be protected against wrong connections by providing only these subscribers with a ten-point checking switch. In this case, an additional figure would have to be appended to the telephone numbers of the privileged subscribers.

We claim:

1. An automatic telephone exchange, comprising a plurality of lines each leading to the telephone apparatus of a subscriber, and each identified by a telephone number consisting of a sequence of figures corresponding with the line in question, and an additional check symbol computed from the figures of said sequence according to a predetermined arithmetical rule, pulsing means operable by a calling subscriber to dial a sequence identifying a line to be called, means including a plurality of impulse-operated selector switches to prepare a connecting circuit between the line of said calling subscriber and the line identified by the sequence dialled, a plurality of impulse-operated checking switches, each having a plurality of positions with a contact at each position, means for connecting one of said checking switches with the line of a calling subscriber in such manner that it is actuated by impulses representing a check symbol dialled by said calling subscriber, means connected only with the contact of said checking switch at the position assumed by said checking switch when the correct check symbol is dialled and actuated by said checking switch only when in said position to complete said connecting circuit, so that the same is only completed if the check symbol dialled by the calling subscriber corresponds according to said arithmetical rule with the sequence dialled and means for indicating a wrong number connected to all the other of said contacts of said checking switch.

2. An automatic telephone exchange as claimed in claim 1, in which said indicating means comprises a signal generator, and in which means actuated by the said checking switches in all positions other than the said one position is provided for connecting said signal generator with the line of a calling subscriber if the check symbol dialled by said subscriber does not correspond according to said arithmetical rule with the sequence dialled.

3. An automatic telephone exchange as claimed in claim 1, further comprising means actuated by the said checking switches in all positions other than the said one position for disconnecting the line of a calling subscriber if the check symbol dialled by said subscriber does not correspond according to said arithmetical rule with the sequence dialled.

4. An automatic telephone exchange as claimed in claim 1, wherein part of the telephone numbers identifying the said lines contain a blank space, or omission of the check figure, by way of check symbol, further comprising a plurality of slowly operating relays, means for exciting one of the said relays after reception of impulses representing a sequence corresponding with a line having said blank space for a check symbol, and means for completing the connecting circuit leading to said line through a make contact of said relay.

5. An automatic telephone exchange as claimed in claim 1, wherein the said checking switches are each individual to one of the said lines, and wherein the connection between a checking switch and the line of a calling subscriber is made through said connecting circuit.

6. An automatic telephone exchange as claimed in claim 5, wherein the said selector switches include a plurality of final selectors giving access to the said lines, further comprising a switch arm in each of the said checking switches coupled by multiple connections with the appertaining contacts of those of the said final selectors which give access to the associated line, a bank of contacts in each of the said checking switches cooperating with said switch arm, the contact in said bank which corresponds with the check symbol ascribed to the associated line being connected with the same, a plurality of slowly operating relays each associated with one of the said lines, and a signal generator, the remaining contacts of said bank being connected with the appertaining one of the said relays, and the said relays serving to connect the line of a calling subscriber with said signal generator if the check symbol dialled by said subscriber does not correspond with the sequence dialled.

7. An automatic telephone exchange as claimed in claim 1, further comprising a plurality of translators for storing and translating the impulse trains dialled by a calling subscriber, and for supplying translated impulse trains to some of the said selector switches, including a final selector, the said checking switches being each individual to one of the said translators, means for connecting any of the said translators with the line of a calling subscriber together with the associated checking switch, in such manner that said checking switch is also actuated by the impulses representing one of the said sequences as dialled by said subscriber, and means actuated by said checking switch in said one position for connecting said translator with said final selector.

8. An automatic telephone circuit as claimed in claim 7, further comprising a signal generator, and a plurality of checking circuits, each associated with one of the said translators, and each comprising the said checking switch, a pair of step magnets adapted to drive said checking switch in opposite directions, a director switch, at least one switch arm in said director switch supplying the impulse trains dialled by a calling subscriber alternately to the said step magnets, means for displacing said switch arm over one position after each impulse train, a preparing relay energized through said switch arm after reception of the impulse trains representing one of the said sequences, a slowly operating connecting relay connected through a make contact of said preparing relay with a home contact of said checking switch, and serving to complete a connection between said translator and said final selector if the check symbol dialled by said subscriber corresponds according to said arithmetical rule with the sequence dialled, a slowly operating wrong number relay connected through a second make contact of said preparing relay with the remaining contacts of checking switch, and serving to connect the line of said subscriber with said signal generator if the check symbol dialled does not correspond with the sequence dialled, and means including one of the said step magnets for returning said checking switch to its home position after disconnection of the line of a calling subscriber.

9. In an automatic switching circuit comprising an input line and a plurality of output lines each identified by symbol groups each consisting of a sequence of digits and an additional check symbol computed from the figures of said sequence according to a predetermined arithmetical rule, pulsing means connected in said input line for producing electric impulses corresponding to selected ones of said symbol groups, a plurality of impulse-operated selector switches, means for connecting some of said selector switches with said input line in such a way as to be actuated by impulses from said pulsing means so as to prepare a connecting circuit between said input line and a selected one of said output lines, at least one impulse-operated checking switch having a plurality of positions with a contact for each position, means for connecting said checking switch with said input line in such manner that it is actuated by impulses from said pulsing means representing the check symbol of the selected symbol group, means connected only with that contact of said checking switch at the position corresponding to said check symbol and thus actuated by said switch only when in said position to complete said connecting circuit so that the same is completed only if the check symbol corresponds according to said arithmetical rule with the selected symbol group and means connected with the contacts at all other of said positions of the checking switch for indicating a wrong number.

No references cited.